May 10, 1966    C. W. RAINEY    3,250,566
MULTIPLE STATION SELECTORS

Filed Feb. 20, 1957    2 Sheets-Sheet 1

C.W. RAINEY
INVENTOR.

BY
ATTORNEYS

United States Patent Office 3,250,566
Patented May 10, 1966

3,250,566
MULTIPLE STATION SELECTORS
Challenor W. Rainey, Dearborn, Mich., assignor to Ford Motor Company, Dearborn, Mich., a corporation of Delaware
Filed Feb. 20, 1957, Ser. No. 641,277
3 Claims. (Cl. 296—68)

This invention pertains to multiple station selectors which among other uses may be applied to automobile or motor vehicle seat controls providing multiple specific individual stations which may be selected by the operator for seat adjustment in either the horizontal, vertical or other desired direction. Reference is made to my copending application Serial No. 573,887 filed March 26, 1956, now abandoned, of which this application is a continuation-in-part.

The embodiment of this invention set forth in the following pages pertains to a motor vehicle seat control wherein there are several specific seat position stations. Each of these stations, which may be selected by the operator, relates to a corresponding seat position and the seat is caused to assume the position relating to a particular selected station through means of an electric motor. Regardless of the position of the seat at the start, a station may be selected on either side of the starting station and the seat will move directly to the selected station. The operator need only select the station and the seat will move to the selected station without further operator action.

In the first embodiment shown below, a circuit is provided whereby the operator has a choice of seven seat positions although this, of course, may be increased or decreased as desired. When a station is selected forward of the starting station, the motor or other power source is energized in a forward direction and when the station selected is rearward of the starting station, the power source is energized in a rearward direction. This invention may be applied to seat movements between any two points whether it be a horizontal, vertical, tilting, swiveling or other type of movement and the terms "forward" and "reverse" are not to be limiting.

Also provided for in this invention is a system whereby upon the closing of a switch which may be activated by a door opening or closing or a seat tilting or any other activating means, the seat may be moved a predetermined number of stations forward or reverse of the particular station for which it is set and upon the opening or reversing of the switch the seat will assume the starting position automatically. For example, when a motor vehicle door is open, the control system will automatically energize the seat moving power source to the most rearward position thereby facilitating entrance into or exit from the vehicle. When the door is closed the seat will automatically return to its original position. In one embodiment shown below is a circuit for moving the driver's seat to the rearmost position when the ignition is turned off and returning the seat to the selected position when the ignition is turned on. This has the advantage of restarting the seat in a rearward travel immediately after the ignition is off so that by the time the front door is opened the seat is retracted providing sufficient room for the driver to exit. Also upon entering the vehicle the seat is in a retracted position until the driver is seated and turns on the ignition. In addition, for moving the seat forward a predetermined number of positions for entrance into the rear portion of the automobile or motor vehicle, a control system is provided whereby upon activation of a switch the seat is moved only a predetermined number of positions forward so that passengers in the front seat will not be crowded and yet provide additional entering area for passengers to the rear seat and upon release of said switch the seat will return automatically to its starting position.

Other objects and advantages of this invention will be made more apparent as this description proceeds, particularly when considered in connection with the accompanying drawings, wherein:

FIGURE 3 shows an embodiment wherein a relay is energized by the ignition coil to return the seat to the selected position from a retracted position when the ignition is turned on.

Figures 1, 2:
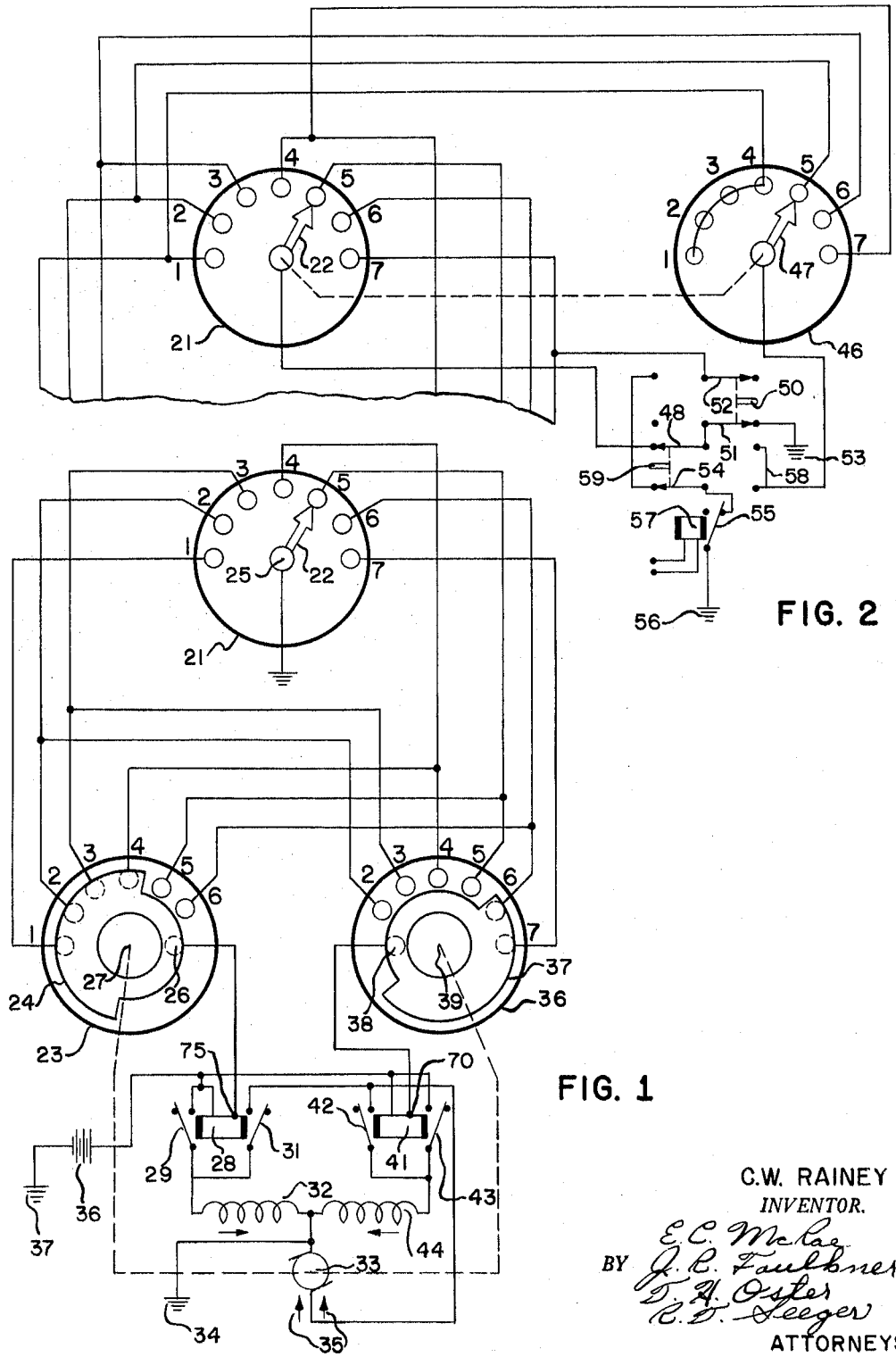
FIGURE 1 is a wiring diagram of an embodiment of this system.
FIGURE 2 is a partial schematic view showing additional electrical and mechanical elements which provide for fully automatic retraction and subsequent advancement of the seat.

In FIGURE 1 is shown a wiring diagram of a preferred embodiment of this invention. In this particular diagram, motor 33 is turned forwardly and reversely depending on the demands dictated by the control system shown. Selector disc 21 has seven stations which are numbered 1 through 7, each of which correspond to successive positions of the automobile seat from the extreme forward position to the extreme rearward position. Selector hand 22 is rotatable about pivot 25 and registrable with each of the seven stations and is shown in registration with station 5. Station 1 indicates the extreme forward position while station 7 indicates the extreme rearward position and movement of hand 22 to a station left of the starting station 5 will cause motor 33 to turn in a forward direction thereby moving the seat an increment to the selected station. Movement of selector hand to the right of starting station 5 will cause motor 33 to turn in a reverse direction causing the seat to move rearwardly in the desired increment corresponding to the selected station. Seat moving connections between the seat and motor are not shown but may be of a conventional kind, such as that disclosed in United States Letters Patent 2,588,165, issued March 4, 1952 in the name of P. F. Rossmann.

Selector plate 21 is made of an insulative material and hand 22 is grounded as indicated. Stations 2 through 6 are each connected to a contact on fore contact plate 23 and aft contact plate 36, while station 1 communicates only with fore contact plate 23 and station 7 communicates only with aft contact plate 36. Plates 23, 36 are made of insulative material with the contacts thereon being of a conductive material while discs 24, 37 which are pivoted respectively at 27 and 39 are made of a conductive material. Contact 26 on plate 23 leads to a forward energizing circuit for motor 33 while contact 38 on plate 36 leads to a rearward energizing circuit for motor 33. In this manner, as discs 24, 37 rotate, the contacts on plates 23, 36 are brought successively into contact with forward and reversing contacts 26, 38 respectively. When coil 28 is energized, relays 29, 31 close energizing field 32 with forward polarity from battery 36 and energizing the armature in motor 33 thereby causing the motor to turn in a forward direction. Similarly, when coil 41 is energized, relays 42, 43 close energizing field 44 with opposite polarity but causing current to pass through the armature of motor 33 in the same direction as indicated by arrows 35 thereby reversing the rotation of motor 33. When either coil 28 or 41 is energized, the motor will turn respectively in forward and reverse directions until the energizing circuit for the coil is broken when the relays will open. Discs 24, 37 are geared to motor 33 and turn in the same direction. When a station is selected forward of the starting station, in this case stations 1 through 4, disc 24 is caused to rotate in a counterclockwise direction and as the seat position corresponding to the stations 1 through 4 is passed, the particular station on plate 23 is uncovered by the outer circumference of disc 24 thereby breaking the circuit between that particular station and contact 26. As motor 33 moves in a forward direction, disc 37 also moves in a counterclockwise direction with the outer circumference of disc 37 covering the station corresponding seat position which is one aft or rearward of the actual seat position, thereby making contact between rearward contact 38 and all stations aft of the actual seat station.

In FIGURE 2 is shown selector 21, selector hand 22, and contacts 1 through 7 with communicating wires as before or as shown in FIGURE 1 together with supplementary selector 46 with selector hand 47 and connections between stations 1 through 4 of selector 21 to stations 4 through 7 of supplementary selector 46. Stations 1 through 4 on selector 46 are electrically joined as shown. Selector hands 22, 47 are mechanically joined by means 48 which is shown as a dashed line so that the two hands move in unison. FIGURE 2 instead of having hand 22 grounded as in FIGURE 1, hand 22 communicates with arm 48 of double pole double throw switch 59 and then through arm 51 of double pole double throw switch 50 to ground 53. Station 7 communicates with arm 52 of switch 50 which may be thrown by opening of the driver's door or other means making contact with arm 54 of switch 59 and then through relay 55 to ground 56. Coil 57 which opens relay 55 is connected to the back up light circuit or otherwise energized when the vehicle transmission is in reverse. Hand 47 communicates with ground 56 when switch 59 is thrown by going through arm 54 and relay 55. Switch 59 may be thrown manually, or operated by opening the passenger door or by tilting of a seat back or otherwise. With this arrangement the seat will move rearwardly to station 7 when the driver's door is open to facilitate entrance if the car is not in reverse and switch 59 is not thrown. When switch 59 is thrown hand 47 is grounded if the car is not in reverse and the seat will move forwardly to allow entrance to the rear seat. When hand 47 on disc 46 is grounded in effect a station on disc 21 a predetermined number of positions forward is grounded thereby moving the seat forwardly.

The operation of the embodiment shown in FIGURE 1 is as follows: Selector hand is turned by the operator from the starting position to the desired position which we shall assume will be 3 on selector 21. By so moving selector hand 22 a circuit to ground is completed to station 3 through plate 24. The circuit from ground to station 3 on plate 36 was incomplete since there is no connecting elements between station 3 and rearward circuit contact 38. However, the circuit from ground to station 3 on plate 23 is completed through disc 24 to forward contact 26 which moves motor 33 forwardly as previously described. The motor turns forwardly moving the seat forwardly and also turning both discs 24 and 37 in a counterclockwise direction, at equal rates. When the outer circumference of disc 24 has uncovered contacts 3 on plate 23 the forward circuit is broken and the motor stops. At this point the outer circumference of disc 37 on plate 36 has just covered station 4 and since it is not in contact with station 3 the rearward circuit will remain open. Moving the selector hand to the right to stations 4 through 7 will complete a circuit through plate stations 4 through 7 through disc 37 to rearward circuit contact 38 which will move the motor in a rearward direction as previously described, rotating both discs 24 and 37 in a clockwise direction. If the contact hand 22 has been moved back to 5 then disc 37 will move clockwise until station 5 on plate 36 has been uncovered thereby opening the circuit stopping the motor. At this point disc 24 on plate 23 has just covered contact 4 providing a forward circuit for stations 1 through 4 and disc 37 on plate 36 providing a rearward circuit tree for stations 6 and 7.

Figure 3:
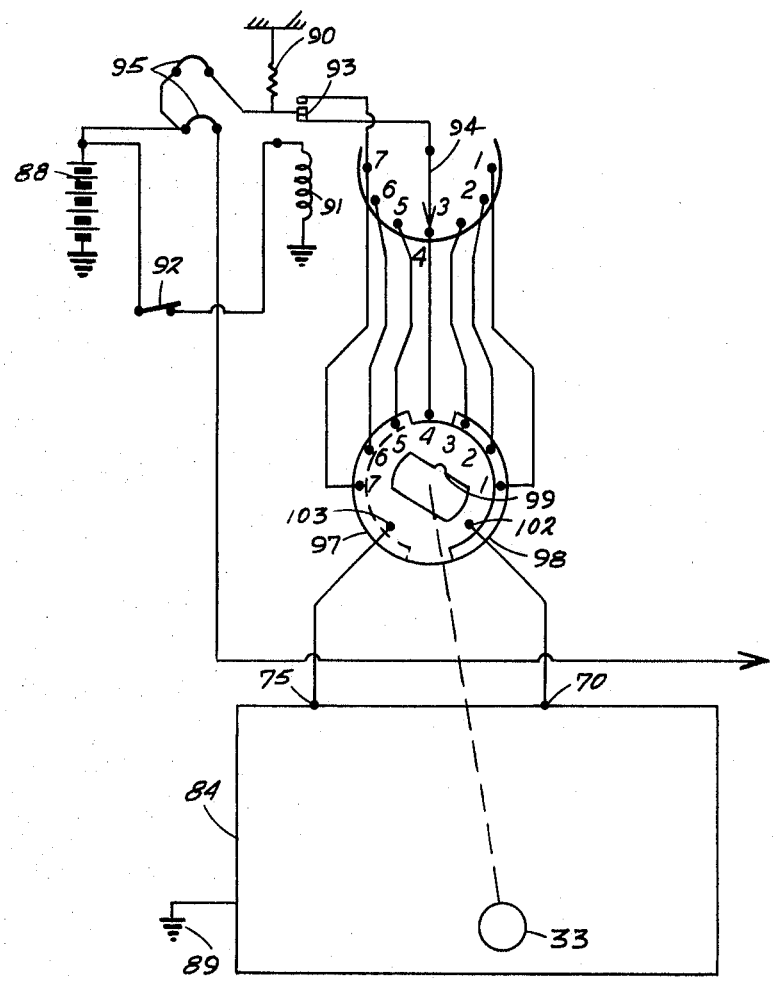
Figure 4:
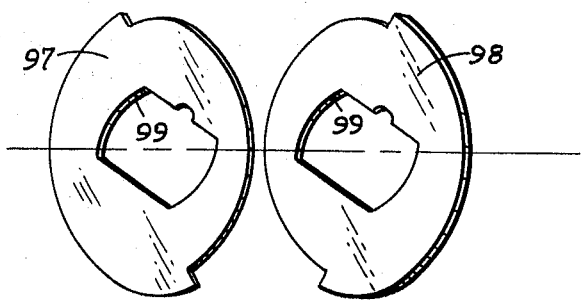
FIGURE 4 shows an exploded view of just the superimposed plates.

In FIGURE 3 is shown means for retracting the driver's seat to the rearwardmost position when the ignition is turned off and returning the seat to the selected position when the ignition is in the "on" position. This is accomplished by relay 91 which is energized when ignition switch 92 is closed, as shown. When ignition switch 92 is opened and relay 91 is de-energized contact 93 will spring to the upper position connecting station 7 or the rearwardmost station to battery 36. Hand 94 registers with stations 1 through 7 and is dialed by the vehicle operator. Each station 1 through 7 is connected to a corresponding contact which contacts are between and are registrable with upper plate 97 and lower plate 98. Plate 97 is superimposed and axially spaced from plate 98 and both plates have keyway 99 which provides means for turning the plates from motor 33. Contact 102 is connected only to plate 97 and contact 103 only to plate 98 with these two contacts leading to respectively connections 75, 70 which are a portion of circuit 84 described above. FIGURE 6 shows the configuration of each plate in an exploded view.

The embodiment shown in FIGURE 3 is at station 4 with plate 97 making contact between each of stations 5, 6, 7 and contact 102 while plate 98 makes contact with stations 1, 2, 3 and contact 103. A forward movement of hand 94 will make a connection between stations forward of 4 with a forward moving circuit and a rearward movement will make contact between stations rearward of 4 with a rearward moving circuit as described for the embodiments above. It is seen in FIGURE 3 that while plates 97 and 98 are superimposed the circuit connections are similar to those shown in FIGURE 1 on plates 23 and 36 with discs 24 and 37. With the arrangement shown in FIGURE 5 just one set of wires is used and battery 36 has been moved from the lower portion of the circuit to the upper. With switch 92 which may correspond to the ignition switch, open relay 91 will be de-energized and contact 93 will be urged by spring 90 into connection with station 7 supplying potential from battery 36 to contact 102 through conductive plate 97 energizing motor 33 in the rearward direction. Upon closing of switch 92 relay 91 will again be energized drawing contact 93 downwardly making connection with hand 94 again moving the set to the previously selected station. The circuit shown in FIGURE 5 while being described for horizontal movement can easily be utilized for vertical movement or other movement with or without the driver access relay 91.

It will be understood that the invention is not to be limited to the exact construction shown and described, but that various changes and modifications may be made without departing from the spirit and scope of the invention, as defined in the appended claims.

What is claimed is:

1. In combination with a vehicle body including a seat and a passenger access door, said seat being mounted on the body by a seat position adjusting mechanism, a power actuator connected with the mechanism for displacing the seat fore and aft in the body, a selector device including an indicating element movable over a range of displacement corresponding to the range of adjustment of said mechanism, a position responsive device connected with the selector device and driven by said mechanism, control means connected with the position responsive device and responsive to positional disagreement of the devices for causing energization of the power actuator, and an override device operable by door opening for interrupting the control influence of the selector device and connected with the position responsive device for causing energization of the power actuator when the position responsive device is displaced from a predetermined position, said override device being operable upon door closing to restore the control influence to the selector device.

2. A position follow-up servo system comprising a selector switch having a plurality of contacts, a selector means registrable with any one of said contacts, a follow-up switch having a plurality of contacts and a null portion registrable with any one of said contacts, each of said contacts being connected to corresponding contacts on said selector switch, an electrical drive means electrically connected to said follow-up switch, said electrical drive means also being connected in driving relationship to said follow-up switch, a relay having a first fixed contact, a second fixed contact, a movable contact, and a winding for actuating said movable contact, said first fixed contact being connected to a selected one of the contacts on said follow-up switch, said second fixed contact being connected to said selector means, a source of electrical energy, said movable contact being connected to said source of electrical energy, said winding being connected to said source of electrical energy through a control switch, said movable contact being biased into contact with said first fixed contact when said control switch is open thereby energizing said electrical drive means through said selected one of said contacts of said follow-up switch, said electrical drive means driving said follow-up switch until the null portion thereof is in registration with said selected contact, said movable contact of said relay moving into contact with said second fixed contact when said control switch is closed thereby energizing said electrical drive means through the contact on said selector switch with which said selector means is engaged and through the corresponding contact on said follow-up switch, said electrical drive means driving said follow-up switch until the null portion thereof is in registration with said corresponding contact.

3. An automatic seat positioning system for selectively positioning a seat in a motor car comprising a reversible electric drive motor drivably connected to move a motor car seat, said motor having a first electrical input effective when energized to cause clockwise motor rotation and a second electrical input effective when energized to cause counterclockwise motor rotation, electrical switch means driven by said motor having a first driven conductive portion connected to the first motor input and a second driven conductive portion connected to the second motor input, said portions defining a dielectric therebetween, a plurality of electrical contacts registerable with said portions, said dielectric adapted to accept only one of said contacts at a time, a selector switch having a plurality of separate contacts, one each connected to each contact on said electrical switch means, said selector switch having a rotatable contact hand registerable with one of said contacts at one time, a source of electrical energy connected between said hand and said motor whereby the selection of a contact by said hand energizes said motor through one of said inputs until said dielectric coincides with the energized contact, an ignition switch, circuit means connected to one of said selector switch contacts and to said source, said means operable upon the opening of said ignition switch to establish a connection between the source and the connected contact to cause the motor to move the seat to a predetermined position and operable upon the closing of said ignition switch to break said connection.

References Cited by the Examiner
UNITED STATES PATENTS

| | | | |
|---|---|---|---|
| 2,393,492 | 1/1946 | Yardeny | 318—467 X |
| 2,405,628 | 8/1946 | Yardeny. | |
| 2,436,068 | 2/1948 | Hegy | 318—33 |
| 2,715,433 | 8/1955 | Dolgorukov | 297—344 |
| 2,884,581 | 4/1959 | Schunemann et al. | 318—256 X |
| 3,044,829 | 7/1962 | Dolgorukov | 297—344 |

FOREIGN PATENTS 848,454   9/1952   Germany.

BENJAMIN HERSH, *Primary Examiner.*

MILTON O. HIRSHFIELD, G. L. BREHM, PHILIP ARNOLD, *Examiners.*

S. B. STONE, L. A. MOUCHA, J. F. MORING,
J. O. HARRELL, R. C. PODWIL, P. GOODMAN,
*Assistant Examiners.*